US009481556B2

(12) United States Patent
Oishi et al.

(10) Patent No.: US 9,481,556 B2
(45) Date of Patent: Nov. 1, 2016

(54) INDUSTRIAL VEHICLE

(71) Applicant: KABUSHIKI KAISHA TOYOTA JIDOSHOKKI, Aichi-ken (JP)

(72) Inventors: Hidefumi Oishi, Kariya (JP); Takahisa Sugimoto, Kariya (JP); Shintaro Watanabe, Kariya (JP); Takashi Sakai, Kariya (JP); Hiromi Ueda, Kariya (JP); Naoto Morisaku, Kariya (JP); Kazuki Maeda, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 14/426,839

(22) PCT Filed: Sep. 3, 2013

(86) PCT No.: PCT/JP2013/073654
§ 371 (c)(1),
(2) Date: Mar. 10, 2015

(87) PCT Pub. No.: WO2014/045864
PCT Pub. Date: Mar. 27, 2014

(65) Prior Publication Data
US 2015/0239719 A1    Aug. 27, 2015

(30) Foreign Application Priority Data
Sep. 18, 2012  (JP) ................................ 2012-204585

(51) Int. Cl.
*B60R 16/04*     (2006.01)
*B66F 9/075*     (2006.01)
(Continued)

(52) U.S. Cl.
CPC ............. *B66F 9/07572* (2013.01); *B60K 1/04* (2013.01); *B60L 11/18* (2013.01); *B66F 9/07531* (2013.01);
(Continued)

(58) Field of Classification Search
CPC .................................... B60K 1/04; E02F 9/18
See application file for complete search history.

(56) References Cited

U.S. PATENT DOCUMENTS 4,047,750 A * 9/1977 Samide .................... 296/107.03
5,983,612 A * 11/1999 Bauswell et al. ............... 56/11.9
(Continued)

FOREIGN PATENT DOCUMENTS

| JP | 5-5681 | 1/1993 |
|---|---|---|
| JP | 07-133096 | 5/1995 |

(Continued)

OTHER PUBLICATIONS

International Search Report and Written Opinion of International Search Authority for App. No. PCT/JP2013/073654, having a mail date of Oct. 8, 2013.
(Continued)

*Primary Examiner* — Hau Phan
*Assistant Examiner* — Jacob Meyer
(74) *Attorney, Agent, or Firm* — Greenblum & Bernstein, P.L.C.

(57) ABSTRACT

An industrial vehicle includes a vehicle body and a battery pack, which is placed in the vehicle body. The battery pack includes a counterweight and at least one battery cell, which partially contacts the counterweight. The battery pack is arranged in the vehicle body such that a contact portion of the counterweight that contacts the at least one battery cell exchanges heat with relative wind by a greater amount than a non-contact portion of the at least one battery cell that have no contact with the counterweight.

14 Claims, 4 Drawing Sheets

(51) Int. Cl.
*B60K 1/04* (2006.01)
*H01M 2/10* (2006.01)
*H01M 10/625* (2014.01)
*H01M 10/647* (2014.01)
*H01M 10/6551* (2014.01)
*H01M 10/6554* (2014.01)
*H01M 10/613* (2014.01)
*H01M 10/655* (2014.01)
*B60L 11/18* (2006.01)
*B60K 11/06* (2006.01)
*B60K 1/00* (2006.01)
*H01M 10/6563* (2014.01)

(52) U.S. Cl.
CPC ....... *B66F 9/07554* (2013.01); *B66F 9/07595* (2013.01); *H01M 2/1083* (2013.01); *H01M 10/613* (2015.04); *H01M 10/625* (2015.04); *H01M 10/647* (2015.04); *H01M 10/655* (2015.04); *H01M 10/6551* (2015.04); *H01M 10/6554* (2015.04); *B60K 11/06* (2013.01); *B60K 2001/005* (2013.01); *B60K 2001/0416* (2013.01); *B60Y 2200/15* (2013.01); *H01M 2/1077* (2013.01); *H01M 10/6563* (2015.04); *H01M 2220/20* (2013.01)

(56) References Cited

U.S. PATENT DOCUMENTS

| | | | |
|---|---|---|---|
| 6,345,677 B1* | 2/2002 | Eckersley et al. | 180/68.5 |
| 6,578,651 B2* | 6/2003 | Murase | 180/89.17 |
| 7,651,811 B2* | 1/2010 | Aker et al. | 429/71 |
| 7,666,543 B2* | 2/2010 | Higashino | H01M 2/1077 |
| | | | 429/130 |
| 7,810,597 B2* | 10/2010 | Imashige | 180/69.2 |
| 8,100,210 B2* | 1/2012 | Takeuchi et al. | 180/68.5 |
| 8,403,090 B2* | 3/2013 | Fujiwara | H01M 2/1077 |
| | | | 180/68.5 |
| 8,492,642 B2* | 7/2013 | Kim | H01M 10/486 |
| | | | 136/200 |
| 8,540,042 B2* | 9/2013 | Atarashi et al. | 180/68.1 |
| 8,727,055 B2* | 5/2014 | Matsumura et al. | 180/68.5 |
| 8,789,636 B2* | 7/2014 | Nishiyama et al. | 180/68.5 |
| 8,857,635 B2* | 10/2014 | Weckbecker et al. | 212/284 |
| 9,287,537 B2* | 3/2016 | Kusunoki | H01G 11/10 |
| 2002/0014361 A1* | 2/2002 | Murase | 180/69.2 |
| 2005/0012314 A1* | 1/2005 | Kubo et al. | 280/757 |
| 2005/0162829 A1* | 7/2005 | Aker et al. | 361/695 |
| 2007/0072063 A1* | 3/2007 | Imashige | 429/96 |
| 2008/0115990 A1* | 5/2008 | Jung et al. | 180/68.5 |
| 2009/0078483 A1* | 3/2009 | Grothkopp et al. | 180/68.5 |
| 2009/0283346 A1* | 11/2009 | Katae et al. | 180/68.2 |
| 2009/0314557 A1* | 12/2009 | Takeuchi et al. | 180/65.1 |
| 2010/0122860 A1* | 5/2010 | McKelvey | B60K 1/00 |
| | | | 180/65.1 |
| 2010/0156079 A1* | 6/2010 | Nakashima | 280/755 |
| 2010/0182750 A1* | 7/2010 | Ehama | 361/697 |
| 2012/0160796 A1* | 6/2012 | Weckbecker et al. | 212/284 |
| 2012/0285757 A1* | 11/2012 | Atarashi et al. | 180/68.1 |
| 2012/0312614 A1* | 12/2012 | Fujiwara | H01M 2/1077 |
| | | | 180/68.5 |
| 2013/0071700 A1* | 3/2013 | Hsu | H01M 10/5004 |
| | | | 429/50 |
| 2013/0075171 A1* | 3/2013 | Noguchi | B60K 11/06 |
| | | | 180/65.1 |
| 2013/0157100 A1* | 6/2013 | Heise | H01M 10/5032 |
| | | | 429/120 |
| 2013/0171480 A1* | 7/2013 | Englert | B60L 3/0046 |
| | | | 429/50 |
| 2013/0299255 A1* | 11/2013 | Matsumura et al. | 180/65.1 |
| 2013/0313030 A1* | 11/2013 | Matsumura et al. | 180/65.1 |
| 2015/0050530 A1* | 2/2015 | Seimiya | 429/61 |
| 2015/0139768 A1* | 5/2015 | Egawa et al. | 414/719 |
| 2015/0203339 A1* | 7/2015 | Sakai et al. | 180/68.5 |
| 2015/0217659 A1* | 8/2015 | Seimiya | 429/61 |
| 2015/0231974 A1* | 8/2015 | Yunoue et al. | 307/10.1 |

FOREIGN PATENT DOCUMENTS

| | | | | |
|---|---|---|---|---|
| JP | 07-172800 | | 7/1995 | |
| JP | 2004-292063 | | 10/2004 | |
| JP | 2009-274651 | | 11/2009 | |
| KR | 2009006067 U | * | 6/2009 | ........ 180/68.5 |
| WO | 2011/089934 | | 7/2011 | |

OTHER PUBLICATIONS

International Preliminary Report on Patentability for App. No. PCT/JP2013/073654, having a mail date of Mar. 24, 2015.
U.S. Appl. No. 14/420,775 to Takashi Sakai et al., filed Feb. 10, 2015.

* cited by examiner

INDUSTRIAL VEHICLE

FIELD OF THE INVENTION

The present invention relates to an industrial vehicle including a battery pack placed in the vehicle body, in particular, to an industrial vehicle including a battery pack having a counterweight and battery cells, which partially contact the counterweight.

BACKGROUND OF THE INVENTION

A known example of an industrial vehicle including a counterweight is a forklift, which Patent Document 1 discloses.

Patent Document 1 discloses an industrial vehicle including a counterweight, which is arranged in a rear portion of the vehicle body to counterbalance a carried load. The counterweight includes an accommodation cavity that extends in the lateral direction of the vehicle and accommodates a battery.

PRIOR ART DOCUMENT

Patent Document

Patent Document 1: Japanese Laid-Open Patent Publication No. 2009-274651

SUMMARY OF THE INVENTION

A battery generates heat when charging and discharging. When the temperature of the battery exceeds a specific temperature, deterioration of the battery is accelerated. Thus, industrial vehicles are desired to efficiently cool a battery.

An objective of the present invention is to provide an industrial vehicle that efficiently cools battery cells.

According to one aspect of the present invention to achieve the above objective, an industrial vehicle is provided that includes a vehicle body and a battery pack, which is placed in the vehicle body. The battery pack has a counterweight and at least one battery cell, which partially contacts the counterweight. The battery pack is arranged in the vehicle body such that a contact portion of the counterweight that contacts the at least one battery cell exchanges heat with relative wind by a greater amount than a non-contact portion of the at least one battery cell that has no contact with the counterweight.

DETAILED DESCRIPTION OF THE PREFERRED EMBODIMENTS

An industrial vehicle according to one embodiment of the present invention will now be described with reference to FIGS. 1 to 4. The industrial vehicle is a reach forklift (hereinafter, referred to simply as "forklift") in the present embodiment. In the following, the direction in which an operator of the forklift faces is defined as a forward direction. The backward, upward, downward, leftward, and rightward directions are defined with reference to the forward direction.

Figure 1:
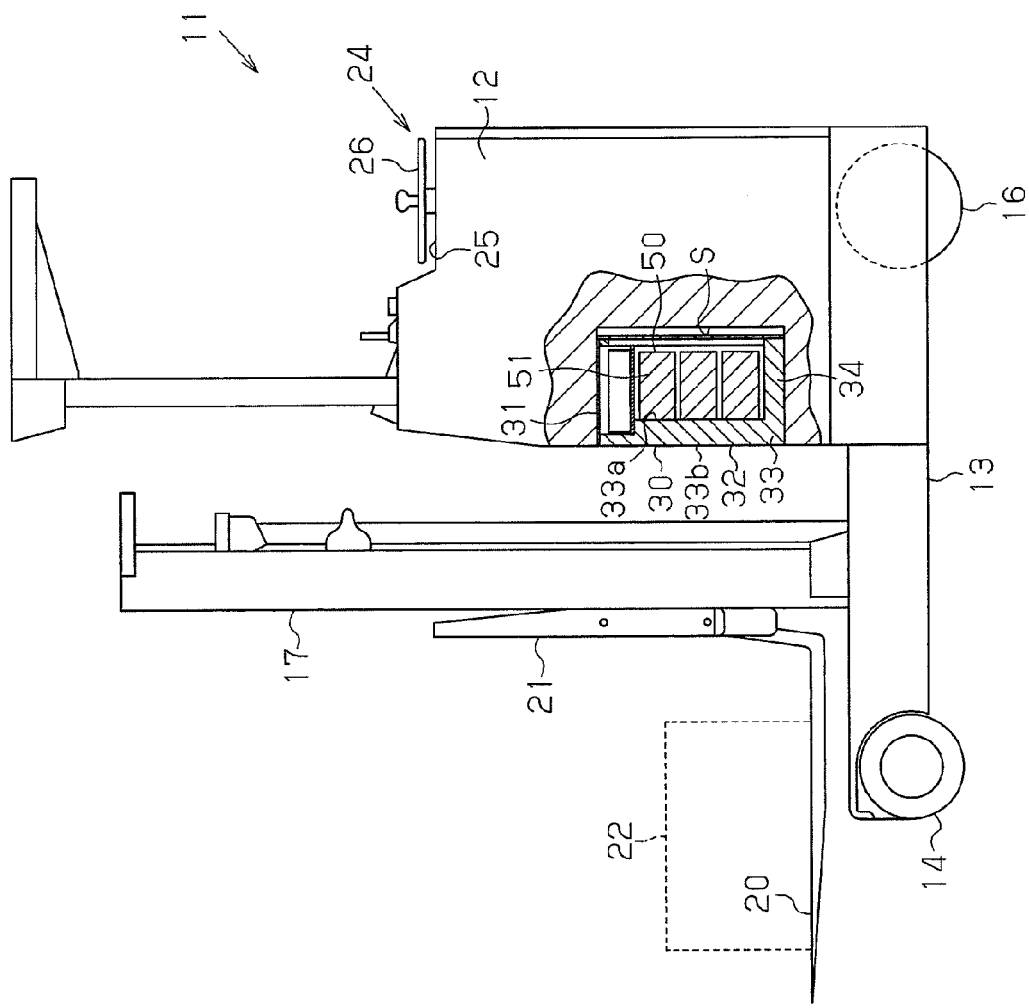
FIG. 1 is a schematic view of a forklift according to one embodiment of the present invention.

As shown in FIG. 1, a forklift 11 has a vehicle body 12, from which a pair of reach legs 13 extends forward. Each of the reach legs 13 has a front wheel 14 arranged in the front portion. The vehicle body 12 has rear wheels 16 and caster wheels (not shown), which are arranged in the rear portion. The rear wheels 16 serve as drive wheels. A mast assembly 17 stands in front of the vehicle body 12 and moves forward and backward along the reach legs 13 by driving reach cylinders (not shown).

A pair of forks 20 is arranged in front of the mast assembly 17 via a lift bracket 21. The forks 20 move upward or downward along the mast assembly 17. A carried load 22 is placed on the forks 20.

A rear portion of the vehicle body 12 includes an operator cab 24 for an operator to stand. A steering wheel 26 for steering the rear wheels 16 is arranged on a steering table 25 in the cab 24. A front portion of the vehicle body 12 has an accommodation cavity S. A battery pack 30 is placed in the accommodation cavity S. The battery pack 30 will now be described in detail.

Figure 2:
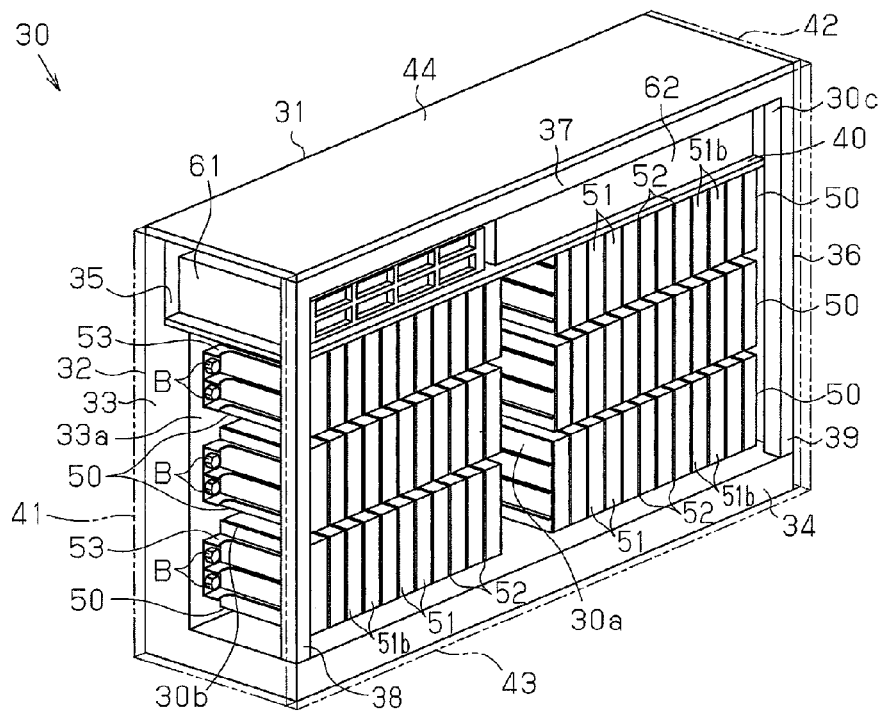
FIG. 2 is a perspective view of a battery pack according to the embodiment.

As shown in FIG. 2, the battery pack 30 includes a case 31. The case 31 includes a counterweight 32 to counterbalance the load 22, which is placed on the forks 20. The counterweight 32 includes a weight portion 34, which is shaped rectangular as viewed from the top, and a plate-like weight body 33, which is vertically arranged at one of two edges in the transverse direction of the weight portion 34 (i.e., a first edge in the transverse direction of the weight portion 34) to stand in the thickness direction of the weight portion 34. The weight body 33 extends from one of two edges in the longitudinal direction of the weight portion 34 (a first edge in the longitudinal direction of the weight portion 34) to the other edge in the longitudinal direction of the weight portion 34 (a second edge in the longitudinal direction of the weight portion 34). In other words, the weight portion 34 extends from the basal edge of the weight body 33 in the thickness direction of the weight body 33. That is, the weight portion 34 extends in a different direction from the direction in which the weight body 33 extends. A cutout portion 35 is formed at the distal end of the weight body 33, i.e., the opposite edge to the basal edge of the weight body 33, by cutting a portion of the weight body 33 in the thickness direction of the weight body 33.

An inverted U shaped frame 36 stands on the weight portion 34 at the second edge, which is opposite to the first edge in the transverse direction of the weight portion 34 (i.e., a second edge in the transverse direction of the weight portion 34), and is spaced from the weight body 33. The frame 36 includes a first pole 38 and a second pole 39, which stand at the two corners of an edge in the transverse direction of the top surface of the weight portion 34. The frame 36 also includes a base 37, which connects the top end of the first pole 38 and the top end of the second pole 39 to each other. In other words, the base 37 connects ends of the first pole 38 and the second pole 39 that are located opposite to ends of the first pole 38 and the second pole 39 that contact the weight portion 34. Accordingly, the battery pack 30 has a main opening 30a surrounded by the weight portion 34 and the frame 36 at the second edge in the transverse direction of the weight portion 34. The main opening 30a of the battery pack 30 is closed by a cover 43, which is shaped like a rectangular plate.

The vertical dimensions of the poles 38 and 39, i.e., the longitudinal dimensions of the poles 38 and 39, are set the same as the shortest distance between the top surface of the weight portion 34 and the top surface of the weight body 33. A top plate 44 is supported by the top surface of the frame 36 and the top surface of the weight body 33. The top plate 44 closes an opening (not shown) between the weight body 33 and the frame 36. The battery pack 30 also has a first opening 30b surrounded by the weight body 33, the weight portion 34, the first pole 38, and the top plate 44 at one of two edges of the weight body 33 in the longitudinal direction (i.e., a first edge in the longitudinal direction of the weight body 33). Further, the battery pack 30 has a second opening 30c surrounded by the weight body 33, the weight portion 34, the second pole 39, and the top plate 44 at the other edge in the longitudinal direction of the weight body 33 (i.e., a second edge in the longitudinal direction of the weight body 33). The first opening 30b is closed by a first cover 41, and the second opening 30c is closed by a second cover 42. Thus, the case 31 includes the counterweight 32, the frame 36, the top plate 44, and the covers 41 to 43.

Figure 3:
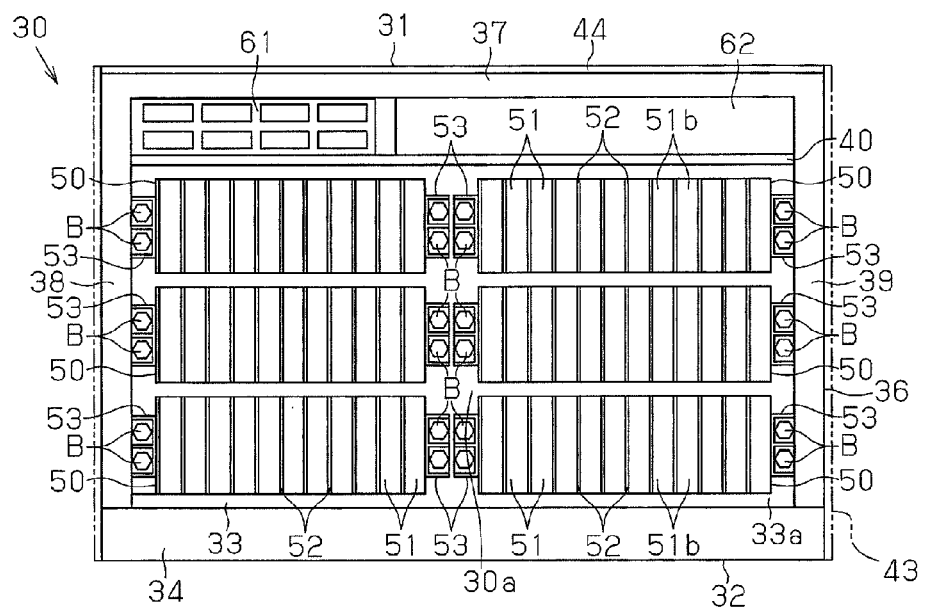
FIG. 3 is a front view of the battery pack according to the embodiment.
Figure 4:
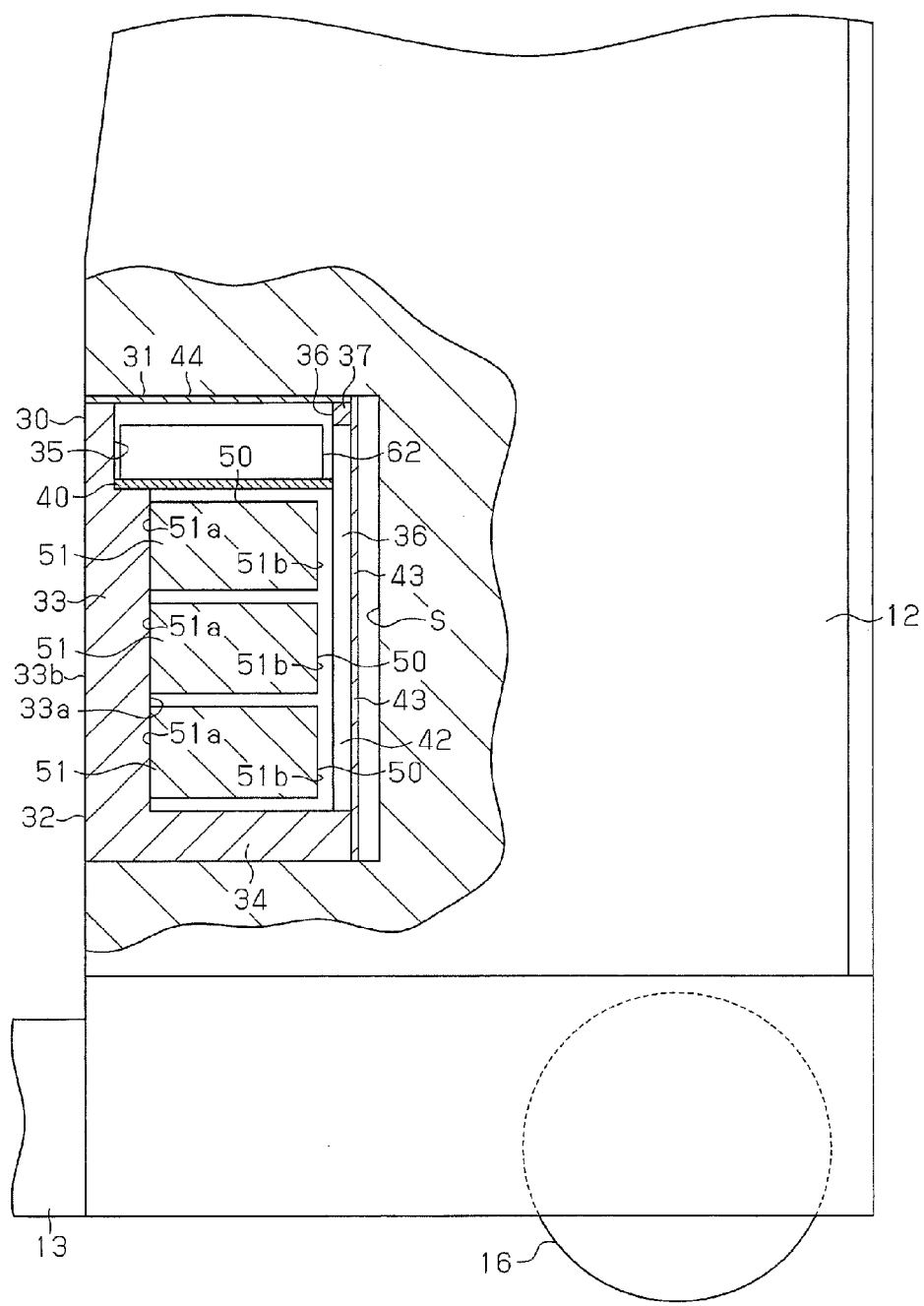
FIG. 4 is an enlarged view showing the positional relationship between the forklift and the battery pack according to the embodiment.

As shown in FIGS. 3 and 4, a first surface (an inner face) in the thickness direction of the weight body 33 is a mounting surface 33a, on which a battery module 50 is mounted. Battery modules 50 spaced apart from one another are mounted on the mounting surface 33a. The battery modules 50 are arranged in two rows spaced apart in the longitudinal direction of the weight body 33 and arranged in three columns spaced apart in the transverse direction of the weight body 33.

Each of the battery modules 50 includes rectangular cells 51 as battery cells, such as lithium ion secondary cells and nickel hydrogen storage cells, and rectangular heat exchanging plates 52, which are thermally coupled to the corresponding rectangular cells 51. The rectangular cells 51 and the heat exchanging plates are alternately arranged. Since the battery modules 50 are arranged in columns in the transverse direction of the weight body 33, the rectangular cells 51 are stacked in the transverse direction of the weight body 33. According to the present embodiment, the rectangular cells 51 are stacked vertically, i.e., in the upward or downward direction of the vehicle body 12. The transverse direction of the weight body 33 corresponds to the stacking direction of the rectangular cells 51. The heat exchanging plates 52 are arranged adjacent to the corresponding rectangular cells 51. The entire surfaces in the thickness direction of the heat exchanging plates 52 contact surfaces in the thickness direction of the corresponding rectangular cells 51.

Each of the battery modules 50 includes brackets 53 fixed to two of the rectangular cells 51 at opposite ends in the direction in which the rectangular cells 51 are arranged. The battery modules 50 are fixed to the weight body 33 by screwing bolts B to the weight body 33 through respective brackets 53. Each rectangular cell 51 has a first surface 51a in the width direction, and each heat exchanging plate 52 has a first surface in the width direction. The first surface 51a and the first surface of the heat exchanging plate 52 contact the counterweight 32. The first surface 51a in the width direction of the rectangular cell 51 is a plane perpendicular to the thickness and height directions of the rectangular cell 51. The first surface in the width direction of the heat exchanging plate 52 is a plane perpendicular to the thickness and height directions of the heat exchanging plates 52.

In the present embodiment, the first surface 51a in the width direction of the rectangular cell 51 corresponds to a contact portion of a battery cell that contacts the counterweight 32. The mounting surface 33a of the weight body 33, which has contact with the first surface 51a, corresponds to a contact portion of the counterweight 32 that contacts the battery cell. The weight body 33 has a second surface (an outer surface) that is opposite to the mounting surface 33a. The second surface corresponds to a portion opposite to the contact portion of the counterweight 32 that contacts the battery cell. The second surface in the thickness direction of the weight body 33 is a radiation surface 33b, which exchanges heat with relative wind. In other words, the counterweight 32 is arranged in the front portion of the vehicle body 12 and has the radiation surface 33b, which is exposed to the outside of the vehicle body 12 and directly exchanges heat with relative wind. The radiation surface 33b corresponds to a portion opposite to the contact portion of the counterweight 32 that contacts the battery cell.

According to the present embodiment, the counterweight 32 is formed with, e.g., a metallic material such as iron. When the rectangular cells 51 of the battery modules 50 generate heat, the heat is transferred to and absorbed by the counterweight 32.

The cutout portion 35 has a top surface, to which a rectangular placing board 40 is fixed. A storage case 61, which stores a control unit for controlling the battery modules 50, and a junction box 62, which stores relays and wires, are placed on the placing board 40.

As shown in FIG. 4, the battery pack 30 configured as above is stored in the accommodation cavity S formed in the front portion of the vehicle body 12. The battery pack 30 is arranged such that the radiation surface 33b opposite to the mounting surface 33a of the weight body 33 faces forward in the vehicle body 12. The radiation surface 33b is located outside the rectangular cells 51. The entire radiation surface 33b is exposed to the outside of the vehicle body 12. The battery pack 30 is also arranged such that the weight portion 34 is located below (vertically lower than) the battery modules 50.

The operation of the forklift 11 according to the present embodiment will now be described.

When the forklift 11 moves forward, the radiation surface 33b of the weight body 33 is cooled down by exchanging heat with relative wind. Since the radiation surface 33b is located closer to the outside than non-contact portions of the rectangular cells 51 that have no contact with the weight body 33, the radiation surface 33b exchanges heat with the relative wind by a greater amount than the non-contact portions of the rectangular cells 51 that have no contact with the weight body 33. The non-contact portions of the rectangular cells 51 that have no contact with the weight body 33 include, e.g., the second surfaces 51b in the width direction of the rectangular cells 51 opposite to the contact portions of the rectangular cells 51 that contact the weight body 33 (the first surfaces 51a in the width direction of the rectangular cells 51). Especially, the radiation surface 33b according to the present embodiment is exposed to the outside of the vehicle body 12 to directly exchange heat with relative wind.

The above illustrated embodiment achieves the following advantages.

(1) The battery pack 30 is arranged in the vehicle body 12 such that the radiation surface 33b of the counterweight 32 exchanges heat with relative wind by a greater amount than the non-contact portions of the rectangular cells 51 that have no contact with the weight body 33 of the counterweight 32.

This allows the relative wind to efficiently cool the radiation surface 33b and avoids excessive heating of the counterweight 32. Thus, the counterweight 32 easily absorbs heat generated by the rectangular cells 51 to efficiently cool the rectangular cells 51.

(2) The transverse direction of the weight body 33 coincides with the stacking direction of the rectangular cells 51. The weight body 33 extends in the same direction as the stacking direction to facilitate assembly of the battery modules 50.

(3) The battery pack 30 is arranged in the vehicle body 12 such that the radiation surface 33b faces forward in the vehicle body 12. The radiation surface 33b, which faces forward in the vehicle body 12, receives more relative wind to further exchange heat with relative wind. This further contributes to efficient cooling of the counterweight 32.

(4) The entire radiation surface 33b directly exchanges heat with relative wind. This further contributes to efficient cooling of the counterweight 32.

(5) The counterweight 32 has the weight portion 34, which extends from the weight body 33. For this reason, the counterweight 32 has more area for discharging heat than the counterweight 32, which has only the weight body 33. This further avoids excessive heating of the counterweight 32. Thus, the counterweight 32 easily absorbs heat generated by the rectangular cells 51 to efficiently cool the rectangular cells 51.

(6) The battery pack 30 is arranged such that the weight portion 34 is located vertically lower than the plurality of battery modules 50. This lowers the center of gravity of the vehicle body 12 to increase an acceptable weight of the load 22 that can be carried by the forks 20.

(7) The weight body 33 is arranged closer to the front of the vehicle body 12 than the rectangular cells 51. For this reason, when the vehicle body 12 is impacted from the front, the weight body 33 absorbs the impact to guard the rectangular cells 51.

The above illustrated embodiment may be modified in the following forms.

In the embodiment, the weight body 33 directly contacts the rectangular cells 51. However, not limited to this, the weight body 33 may indirectly contact the rectangular cells 51 via a heat transfer sheet. Alternatively, when a battery holder holds the rectangular cells 51, the weight body 33 may contact the rectangular cells 51 via the battery holder.

In the embodiment, it may be unnecessary for the radiation surface 33b of the weight body 33 to directly exchange heat with relative wind. For example, there may be a case in which a portion of the vehicle body 12 covers the front of the radiation surface 33b, and the vehicle body 12 contacts the radiation surface 33b of the weight body 33. In this case, the portion of the vehicle body 12 exchanges heat with relative wind, and the cooled portion of the vehicle body 12 indirectly cools the radiation surface 33b.

There may be another case in which a portion of the vehicle body 12 that is located closer to the front than the radiation surface 33b is spaced from the radiation surface 33b of the weight body 33. In this case, the portion of the vehicle body 12 exchanges heat with relative wind to cool the portion of the vehicle body 12. The cooled portion of the vehicle body 12 exchanges heat with heat medium (air) between the portion of the vehicle body 12 and the radiation surface 33b of the weight body 33 and cools the heat medium. The radiation surface 33b then exchanges heat with the cooled heat medium to cool the radiation surface 33b.

Furthermore, the radiation surface 33b may have no need to expose the entire surface. The radiation surface 33b may be partially exposed to the outside of the vehicle body 12 so that only the exposed portion directly exchanges heat with relative wind.

In the embodiment, the accommodation cavity S may be formed in a rear portion of the vehicle body 12 to place the battery pack 30 in the rear portion of the vehicle body 12. In this case, the battery pack 30 is arranged such that the radiation surface 33b faces backward in the vehicle body 12 and is cooled with relative wind by a greater amount than the non-contact portions of the rectangular cells 51 that have no contact with the weight body 33 when the forklift 11 moves backward.

In the embodiment, the counterweight 32 may consist of only the weight body 33 without the weight portion 34.

In the embodiment, the weight portion 34 may have any shape.

In the embodiment, the weight body 33 may have any shape. Even in such a case, the battery pack 30 is arranged such that a contact portion of the weight body 33 that contacts the rectangular cells 51 exchanges heat with relative wind by a greater amount than surfaces opposite to contact surfaces of the rectangular cells 51 that contact the weight body 33.

In the embodiment, cylindrical cells or laminated cells may be used as the battery cells.

In the embodiment, the radiation surface 33b of the weight body 33 may be arranged to face in the width direction (the lateral direction) of the vehicle body 12. In other words, a modification is possible as long as the rectangular cells 51 and the counterweight 32 are arranged such that a portion of the weight body 33 that contacts the rectangular cells 51 exchanges heat with relative wind by a greater amount than surfaces opposite to surfaces of the rectangular cells 51 that contact the weight body 33.

The present invention may be embodied in any industrial vehicle other than the forklift 10. Such industrial vehicles include excavators.

In the embodiment, a fan may be provided in the vehicle body 12 to send wind to the radiation surface 33b.

In the embodiment, fins may be formed on the radiation surface 33b to improve heat exchange efficiency. Furthermore, fins may be formed on an outer surface of the counterweight 32, an outer surface of the top plate 44, and outer surfaces of the covers 41 to 43. Such fins may have any shapes. The fins may be, e.g., plate-like fins (straight fins) or pin-shaped fins.

Figure 5:
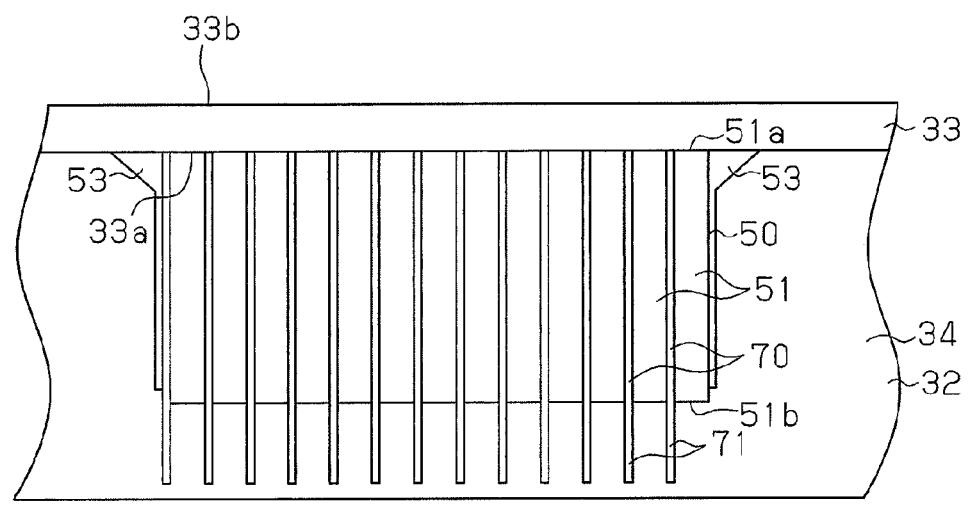
FIG. 5 is a plan view showing a battery module according to another embodiment.

As shown in FIG. 5, the heat exchanging plates 70 may be sized in the width direction of the rectangular cells 51 to be greater than the size in the width direction of the rectangular cells 51. Thus, the heat exchanging plates 70 protrude from the second surfaces 51b in the width direction of the rectangular cells 51. In other words, the heat exchanging plates 70 partially protrude opposite to the contact portions of the rectangular cells 51 that contact the weight body 33 (the first surfaces 51a in the width direction of the rectangular cells 51). In this case, the heat exchanging plates 70 have protruded portions 71, which protrude from the second surfaces 51b in the width direction of the rectangular cells 51. The protruded portions 71 exchange heat with surrounding heat medium to discharge heat generated by the rectangular cells 51. This efficiently cools the rectangular cells 51. Moreover, the weight body 33 and the protruded portions 71 of the heat exchanging plates 70 cool the rectangular cells 51 from both sides in the width direction of the rectangular cells 51 to reduce temperature difference among the rectangular cells 51.

A fan may be provided to send heat medium to the outer surface of the counterweight, the outer surface of the top plate, the outer surfaces of the covers 41 to 43, and the protruded portions 71 of the heat exchanging plates 70 shown in FIG. 5.

What is claimed is:

1. An industrial vehicle comprising:
a vehicle body; and
a battery pack, which is placed in the vehicle body, wherein
the battery pack has a counterweight and a plurality of battery cells, each of the plurality of battery cells contact the counterweight at a contact portion of the counterweight,
the contact portion of the counterweight is exposed to an outside environment surrounding the industrial vehicle such that the contact portion exchanges heat with relative wind by a greater amount than non-contact portions of the plurality of battery cells that have no contact with the counterweight,
the contact portion extends along a vertical direction of the industrial vehicle, and
each of the plurality of battery cells are vertically stacked in the vehicle body and contact the counterweight at the contact portion along the vertical direction of the industrial vehicle.

2. The industrial vehicle according to claim 1, wherein
the counterweight has a portion opposite to the contact portion contacting the plurality of battery cells, and
the battery pack is arranged such that at least a part of the opposite portion faces forward in the vehicle body.

3. The industrial vehicle according to claim 1, wherein
the counterweight has a portion opposite to the contact portion contacting the plurality of battery cells, and
the battery pack is arranged such that at least a part of the opposite portion directly exchanges heat with the relative wind.

4. The industrial vehicle according to claim 1, wherein
the contact portion is a weight body that contacts the plurality of battery cells and extends in the vertical direction and the counterweight includes a weight portion that is arranged in the weight body, and
the weight portion extends in a different direction from the vertical direction in which the weight body extends.

5. The industrial vehicle according to claim 1, wherein the counterweight has a radiation surface that is arranged in a front portion of the vehicle body and is exposed to the outside of the vehicle body to directly exchange heat with the relative wind.

6. The industrial vehicle according to claim 1, wherein the battery pack includes a heat exchanging plate that is arranged between two adjacent battery cells of the plurality of battery cells.

7. The industrial vehicle according to claim 6, wherein the heat exchanging plate is a rectangular plate.

8. The industrial vehicle according to claim 4, wherein the weight portion stands on a basal edge of the weight body in a thickness direction of the weight body.

9. The industrial vehicle according to claim 4, wherein the weight portion is located vertically lower than the plurality of battery cells.

10. The industrial vehicle according to claim 1, wherein the industrial vehicle is a forklift.

11. The industrial vehicle according to claim 6, wherein
a width dimension of the heat exchange plate is greater than a corresponding width dimension of adjacent battery cells of the plurality of battery cells, and
the heat exchanging plate protrudes from a surface of each adjacent battery cell that is located opposite to the contact portion.

12. An industrial vehicle comprising:
a vehicle body; and
a battery pack, which is placed in the vehicle body, wherein
the battery pack has a counterweight and a plurality of battery cells, the plurality of battery cells partially contact the counterweight at a contact portion of the counterweight,
the contact portion of the counterweight is exposed to an outside environment surrounding the industrial vehicle such that the contact portion exchanges heat with relative wind by a greater amount than a non-contact portion of the plurality of battery cells that has no contact with the counterweight,
a heat exchanging plate is arranged between two adjacent battery cells of the plurality of battery cells, and
the heat exchanging plate is thermally coupled to the plurality of battery cells such that an entire surface in a thickness direction of the heat exchanging plate contacts a surface in a thickness direction of one of the two adjacent battery cells, and a surface in a width direction contacts the counterweight, and heat generated by the two adjacent battery cells is discharged through the heat exchanging plate.

13. An industrial vehicle comprising:
a vehicle body; and
a battery pack, which is placed in the vehicle body, wherein
the battery pack has a counterweight and a plurality of battery cells, each of the plurality of battery cells contact the counterweight at a contact portion of the counterweight,
the battery pack is placed in the vehicle body such that at least a part of the counterweight that is opposite to the contact portion of the counterweight directly exchanges heat with a fluid in the outside environment,
the contact portion extends along a vertical direction of the industrial vehicle, and
each of the plurality of battery cells are vertically stacked in the vehicle body and contact the counterweight at the contact portion along the vertical direction of the industrial vehicle.

14. An industrial vehicle comprising:
a vehicle body; and
a battery pack, which is placed in the vehicle body, wherein
the battery pack has a counterweight and a plurality of battery cells, each of the plurality of battery cells contact the counterweight at a contact portion of the counterweight,
the contact portion of the counterweight is exposed to an outside environment surrounding the industrial vehicle such that the contact portion exchanges heat with a fluid in the outside environment by a greater amount than non-contact portions of the plurality of battery cells that have no contact with the counterweight,
the contact portion extends along a vertical direction of the industrial vehicle, and
each of the plurality of battery cells are vertically stacked in the vehicle body and contact the counterweight at the contact portion along the vertical direction of the industrial vehicle.

* * * * *